Dec. 29, 1953     E. E. MAKRUSKI     2,664,063

AUTO BODY REPAIR FIXTURE

Filed Feb. 21, 1950

INVENTOR.
EDWARD E. MAKRUSKI
BY
Oberlin & Limbach
ATTORNEYS.

Patented Dec. 29, 1953

2,664,063

UNITED STATES PATENT OFFICE 2,664,063

AUTO BODY REPAIR FIXTURE

Edward E. Makruski, Elyria, Ohio

Application February 21, 1950, Serial No. 145,485

1 Claim. (Cl. 113—99)

This invention relates, as indicated, to auto body repair fixtures and more particularly to such a fixture which is especially suited for use in the patching of portions of the body adjacent a wheel.

As those familiar with automobile repair work well know, it is a very difficult job to patch portions of the body in the vicinity of a wheel which have rusted out, for example. A patch conforming to the shape of the repair to be made must, of course, be braced or backed for welding, and although it is a fairly simple matter to brace the patch against a portion of the body which is substantially parallel with the floor, it becomes increasingly difficult to do so where the repair slants or curves away from the horizontal.

One object of this invention is to provide a device for use in the patching of portions of an automobile body adjacent a wheel which is both inexpensive of manufacture and easy to operate.

Another object is to provide a device which is equally suitable for bracing patches against portions of the body which are substantially parallel with the floor, or which slant or curve away from the horizontal.

Other objects and advantages will become apparent as the following description proceeds.

To the accomplishment of the foregoing and related ends, the invention, then, comprises the features hereinafter fully described and particularly pointed out in the claim, the following description and the annexed drawings setting forth in detail certain illustrative embodiments of the invention, these being indicative, however, of but a few of the various ways in which the principle of the invention may be employed.

Broadly stated, my invention consists of means associated with the axle of an automobile which will present a substantially radial abutment for a jack, which, when in position, is adapted to bear against the portion of the auto being repaired.

Within the broad statement of this invention as set out above, there are, of course, various specific forms which may be provided to embody the same, these forms differing mainly in regards their physical structure in accordance with the portion of the axle assembly to which they are attached, or the manner of attachment thereof. In the illustrated embodiment of my invention which will now be described, the device is of such form that it may be secured to the bolts normally securing the wheel to the brake drum.

Figure 1:
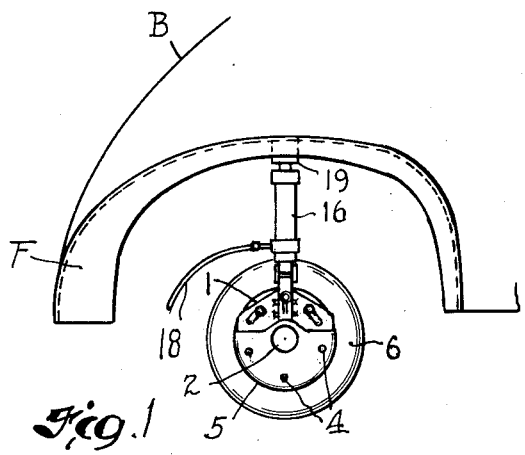
Fig. 1 is a side view showing the device of my invention as it would be mounted for the patching of a portion of an automobile body adjacent a wheel.
Figure 2:
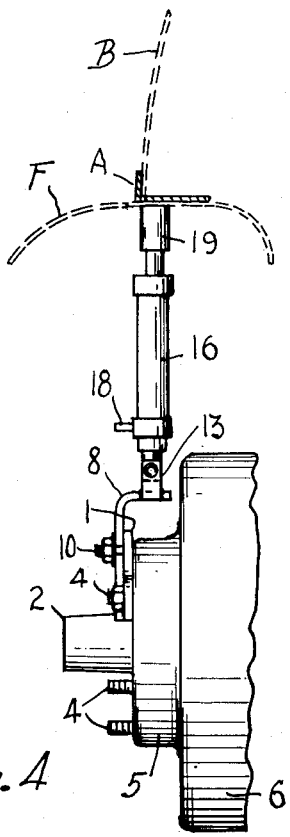
Fig. 2 is an end view of the apparatus shown in Fig. 1.
Figure 3:
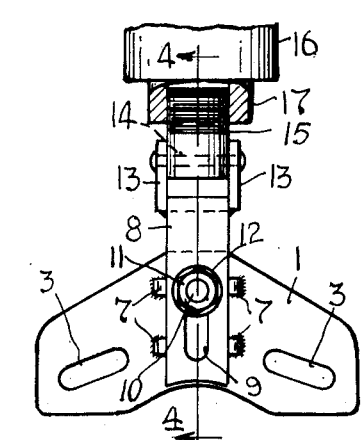
Fig. 3 is a side view of a preferred embodiment of my invention.
Figure 4:
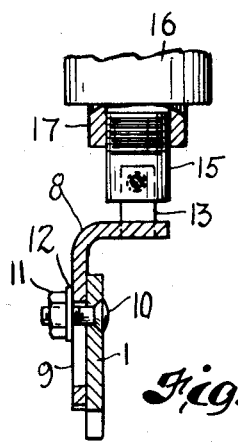
Fig. 4 is a view taken along the line 4—4 on Fig. 3.
Figure 5:
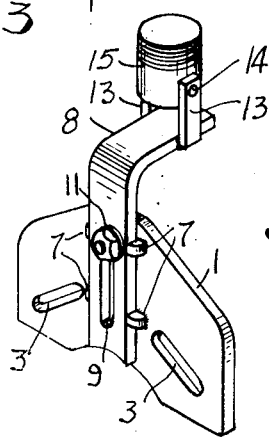
Fig. 5 is a perspective view of the device embodying my invention.

Referring now to the drawing and more particularly to Figs. 1 and 2 thereof, the device of my invention is there shown as it would be mounted to brace a patch A against a portion of an automobile body generally indicated at B having a fender F. The device comprises a plate 1, the lower portion of which is curved upwardly in order to clear the hub 2. A pair of laterally spaced slots 3 sloping upwardly towards the middle of the plate are provided to receive any two adjacent studs 4 mounted on the boss 5 of the brake drum 6. Pairs of vertically spaced lugs or guides 7 spaced on either side of the center of the plate are provided to form a vertical slideway, and slidably mounted therein is a slide 8 having a longitudinally extending slot 9 formed in the lower portion thereof. The usual bolt 10, secured in the plate and extending through the slot 9 of the slide, nut 11 and washer 12 are provided adjustably to secure the plate and slide together. The slide 8 is bent inwardly, as shown, and welded adjacent the end thereof are a pair of laterally spaced, upstanding arms 13 with a pin 14 interposed therebetween pivotally supporting a cylindrical plug 15, the upper portion of which is threaded.

It is well known, of course, that some later model autos employ brake drums which do not have a boss 5 as shown in Figs. 1 and 2, the studs being secured directly on such brake drum. For use on these autos, the slide 8 of my device may be modified slightly so that the outer extremity of the same extends beyond the periphery of the brake drum.

A jack 16 is interposed between the patch A and plug 15, carrying an internally threaded cap 17 at one end thereof which is adapted to cooperate with the threaded plug 15, thereby securing such two members together. Pneumatic or hydraulic pressure may be applied through the hose 18 to force the piston 19 of the jack outwardly to press the patch A firmly against the body in preparation for the welding operation. With the plug 15 pivotally mounted by pin 14, such plug may be rotated in a clockwise direction as viewed in Fig. 2, so as to permit the jack 16 to bear against the patch at points near the inner edge of the latter.

Having thus described my invention, its operation will be readily apparent. The repairman will first jack up the automobile and remove the wheel adjacent the portion of the body to be repaired, and the plate 1 is then placed over any two adjacent studs 4 and securely bolted thereto. The jack 16 may then be threaded onto the plug 15 in the manner indicated, with the adjustable connection between the plate 1 and slide 8 being available to adjust the length of the apparatus to facilitate assembly. With the patch in place, pressure may then be applied to the jack forcing the piston thereof to tightly press the patch against the body for welding. If it is desired to brace the patch at various other points along its length, the brake drum 6 is merely rotated to bring the jack into proper position and the welding operation may proceed without appreciable interruption.

Thus, by the use of a very simple device which may utilize a jack of standard construction, a simple means is provided for bracing a patch against a portion of the body adjacent a wheel at a number of points without any adjustment being required in the mounting of the device.

Although I have described only one preferred embodiment of my repair fixture, it is evident that other forms may be employed without departing from the principle of my invention. For example, the device may be adapted to be mounted on the axle flange to which is ordinarily secured the brake drum. Or, it may be adapted for mounting on the rim of the automobile wheel. However, these forms differ only in regards their manner of attachment to a rotatable element of the automobile axle and come clearly within the broad statement of my invention as set out above.

Other modes of applying the principle of the invention may be employed, change being made as regards the details described, provided the features stated in the following claim, or the equivalent of such, be employed.

I therefore particularly point out and distinctly claim as my invention:

In an auto-body repair fixture, a bracket comprising a plate adapted to be secured to an auto wheel mount, a slideway on said plate, a slide mounted in said slideway and adapted to be adjustably secured to said plate, a jack member secured to said slide adapted to bear against the body of the auto, said bracket having a pair of laterally spaced slots adapted for engagement with the studs of an auto wheel mount, and said jack member being disposed so as to perpendicularly bisect a line connecting the upper ends of said slots, and being adapted thus to extend radially outwardly from such wheel mount, said slots being non-parallel and symmetrically disposed relative to said member, said slots further extending in a direction substantially tangent to a circle about the axis of the wheel mount.

EDWARD E. MAKRUSKI.

References Cited in the file of this patent

UNITED STATES PATENTS

| Number | Name | Date |
|---|---|---|
| 783,031 | Fell | Feb. 21, 1905 |
| 868,966 | Chase | Oct. 22, 1907 |
| 935,203 | Humphries | Sept. 28, 1909 |
| 1,405,555 | Kuehner | Feb. 7, 1922 |
| 1,459,908 | Drolshagen | June 26, 1923 |
| 1,686,442 | Do Ran | Oct. 2, 1928 |
| 1,775,968 | Nelson | Sept. 16, 1930 |
| 1,795,041 | Replogle | Mar. 3, 1931 |
| 2,183,427 | Hou | Dec. 12, 1939 |
| 2,422,144 | Stevens | June 10, 1947 |
| 2,546,458 | Launder | Mar. 27, 1951 |